United States Patent [19]

Degen et al.

[11] 4,212,644
[45] Jul. 15, 1980

[54] DYED PAPER

[75] Inventors: Hans-Juergen Degen, Lorsch; Klaus Grychtol, Bad Durkheim, both of Fed. Rep. of Germany

[73] Assignee: BASF Aktiengesellschaft, Ludwigshafen, Fed. Rep. of Germany

[21] Appl. No.: 927,947

[22] Filed: Jul. 25, 1978

[30] Foreign Application Priority Data
Jul. 25, 1977 [DE] Fed. Rep. of Germany ....... 2733468

[51] Int. Cl.² .............................................. D21H 1/46
[52] U.S. Cl. ........................................ 8/506; 542/433; 542/449
[58] Field of Search ................................. 8/7; 96/130

[56] References Cited

U.S. PATENT DOCUMENTS

| 104,006 | 6/1870 | Fitzgerald | 8/7 |
| 2,085,163 | 6/1937 | Lubs et al. | 8/7 |
| 3,243,298 | 3/1966 | Libeer et al. | 96/130 |
| 3,574,200 | 4/1971 | Brack | 8/7 |
| 3,931,156 | 1/1976 | Libeer et al. | 260/240.4 |

FOREIGN PATENT DOCUMENTS 686202 5/1964 Canada ............................................. 8/7

OTHER PUBLICATIONS

The Paper Industry, Sep., 1954, pp. 589–592.

Primary Examiner—Ronald W. Griffin
Attorney, Agent, or Firm—Oblon, Fisher, Spivak, McClelland & Maier

[57] ABSTRACT

Paper dyed with compounds of the general formula I

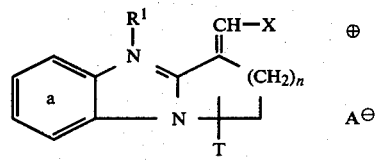

where $R^1$ is unsubstituted or substituted alkyl, T is hydrogen or alkyl, $A^\ominus$ is an anion, n is 1, 2 or 3 and X is an aminoaryl radical which may or may not possess further substituents, and where the benzene nucleus a may be substituted by alkyl, hydroxy, alkoxy, chlorine, bromine, amino, alkylamino, dialkylamino, alkanoylamino or nitro. The compounds of the formula I dye paper in brilliant yellow shades. They are also suitable for dyeing materials containing anionic groups.

11 Claims, No Drawings

DYED PAPER

The present invention relates to paper dyed with a compound of the general formula I

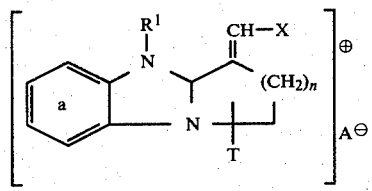

where $R^1$ is unsubstituted or substituted alkyl, T is hydrogen or alkyl, $A^\ominus$ is an anion, n is 1, 2 or 3 and X is an aminoaryl radical which may or may not possess further substituents, and where the benzene nucleus a may be substituted by alkyl, alkoxy, chlorine, bromine, amino, alkylamino, dialkylamino, alkanoylamino or nitro.

Alkyl and alkoxy radicals present in the ring a are in particular of 1 to 4 carbon atoms and are preferably methyl, ethyl, methoxy or ethoxy. Substituted amino groups present in the ring a preferably contain, as substituents, alkyl of 1 to 4 carbon atoms and alkanoyl of 1 to 4 carbon atoms, more specifically methyl, ethyl, acetyl and propionyl. The radicals X in particular have the formula

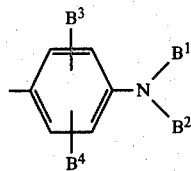

where $B^1$ forms a ring with the o-position of the aryl radical or $B^1$ and $B^2$ independently of one another are hydrogen or unsubstituted or substituted alkyl, alkenyl, cycloalkyl, aralkyl or aryl, or $B^1$ and $B^2$ conjointly with the N atom are a heterocyclic ring, $B^3$ is hydrogen, alkyl, hydroxyl or alkoxy, $B^4$ is hydrogen, chlorine, bromine or alkyl and $B^3$ and $B^4$ together are a fused benz ring.

In addition to hydrogen, examples of radicals $B^1$ and $B^2$ are alkyl of 1 to 8 carbon atoms which may be substituted by amino, alkoxy of 1 to 4 carbon atoms, chlorine, bromine, cyano, alkylamino of 1 to 4 carbon atoms, dialkylamino, where alkyl is of 1 to 4 carbon atoms, trialkylammonium, where alkyl is of 1 to 4 carbon atoms, alkanoyloxy of 1 to 8 carbon atoms, alkoxycarbonyl, where alkoxy is of 1 to 8 carbon atoms, alkylaminocarbonyloxy, where alkyl is of 1 to 4 carbon atoms, or alkanoylamino of 1 to 4 carbon atoms and further examples are allyl, cyclohexyl, benzyl which may be substituted by methyl or methoxy, phenylethyl and phenyl which may be substituted by methoxy, ethoxy or chlorine.

Specific examples in addition to the radicals $B^1$ and $B^2$ already mentioned are methyl, ethyl, n- and iso-propyl, n-, iso- and tert.-butyl, hydroxyethyl, cyanoethyl, methoxyethyl, ethoxyethyl, aminoethyl, dimethylaminoethyl, trimethylammoniummethyl, chloroethyl, bromoethyl, acetoxyethyl, aminocarbonylethyl, dimethylaminocarbonylethyl, β-hydroxy-n-propyl, β-hydroxy-n-butyl and β-hydroxy-iso-butyl.

If $B^1$ forms a ring with the o-position of the aryl radical, X in particular has the formula

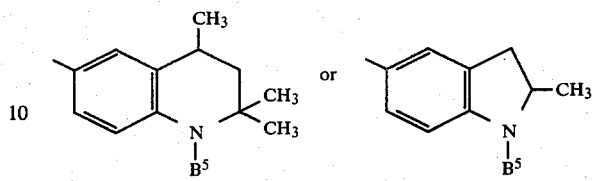

where $B^5$ is benzyl or alkyl of 1 to 4 carbon atoms, preferably methyl.

Examples of heterocyclic rings

are pyrrolidinyl, morpholinyl, piperidinyl, piperazinyl and tetrahydropyrazolyl.

Specific examples of radicals $R^1$ are methyl, ethyl, n- and iso-propyl, n-, iso- and tert.-butyl, pentyl, hexyl, heptyl, octyl, nonyl, decyl, undecyl, dodecyl, chloroethyl, bromoethyl, hydroxyethyl, methoxyethyl, ethoxyethyl, cyanoethyl, acetoxyethyl, aminocarbonylethyl, β-hydroxy-n-propyl, β-hydroxy-n-butyl, β-hydroxy-iso-butyl, phenylmethyl, phenylethyl, p-methylphenylmethyl, p-methoxyphenylmethyl and p-ethoxyphenylmethyl.

Alkyl and alkoxy radicals $B^3$ and $B^4$ are, in particular, methyl, ethyl, ethoxy and methoxy.

The compound of the formula I may be prepared by condensing a compound of the formula II

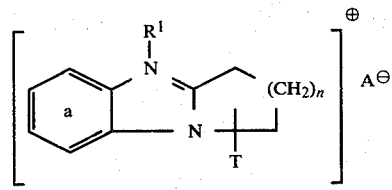

with a compound of the formula III $$X-CHO \qquad \qquad III$$

in a basic medium.

The condensation may be carried out in the presence or absence of a solvent. Examples of suitable solvents are primary, secondary and tertiary amines, halohydrocarbons, alcohols, glycols, glycol ethers, DMF, NMP, DMSO and HMPT, which may or may not be mixed with water or with one another.

Specific examples of suitable solvents are (aqueous) methylamine, ethylamine, piperidine, pyrrolidine, dimethylamine, diethylamine, triethylamine, methylene chloride, chloroform, carbon tetrachloride, chloroethane, 1,1- and 1,2-dichloroethane, chlorobenzene, 1,2-dichlorobenzene, methanol, ethanol, n- and isopropanol, n-, iso- and tert.-butanol, ethylene glycol, glycerol, butylglycol, ethylene glycol monomethyl ether, propylene diglycol, dimethylformamide, NMP, DMSO and HMPT.

The medium may be rendered basic by using, for example, an alkali, alcoholate or amine. Specific examples are magnesium oxide, calcium oxide, dimethylamine, diethylamine, di-n-propylamine, di-iso-propylamine, di-n-butylamine, di-iso-butylamine, N-methylaniline, N-ethylaniline, methylamine, ethylamine, n- and iso-propylamine, n-, iso- and tert.-butylamine, aniline, triethylamine, trimethylamine, dimethylaniline, pyridine, α-, β- and γ-picoline, or a methanolate, ethanolate, n- and iso-propanolate and n-, iso- and tert.-butanolate.

As may be seen, the base and the solvent can be identical.

Further details of the condensation reaction may be found in the Examples, where parts and percentages are by weight, unless stated otherwise.

A compound of the formula II may be obtained from a compound of the formula IV

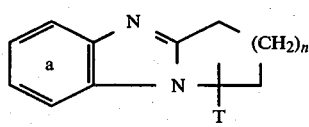

by quaternizing with $R^1$-A, where A is a radical removable as an anion.

Examples of anions $A^\ominus$, which can also be introduced into the quaternized products by double decomposition, are chloride, bromide, sulfate, methosulfate, ethosulfate, toluenesulfonate, benzenesulfonate, nitrate, phosphate, acetate, formate, hydroxyl, tetrafluoborate, bisulfate, aminosulfate, hydrogen phosphate, metaphosphate, bicarbonate, tetrachlorozincate, chloroacetate, hydroxyacetate, propionate, trichloroacetate, benzoate and phthalate.

A compound of the formula IV is obtained from a compound of the formula

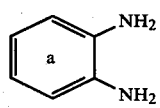

by reaction with a lactone or lactam of the formula

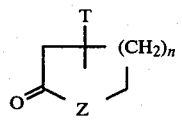

where Z is —O— or —NR—, R is hydrogen or alkyl and the benzene nucleus A may have the stated substituents.

The invention in particular relates to paper dyed with a compound of the formula

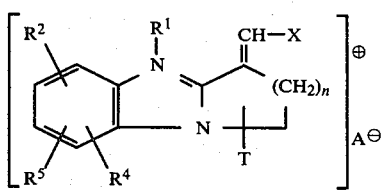

where $R^1$ is alkyl of 1 to 12 carbon atoms, alkyl of 2 to 4 carbon atoms which may be substituted by hydroxyl, alkoxy of 1 to 4 carbon atoms, alkanoyloxy of 1 to 4 carbon atoms, carbamoyl, cyano, chlorine or bromine, benzyl, which is unsubstituted or substituted by methyl, methoxy, ethoxy or chlorine, or phenylethyl, $R^2$ is hydrogen, chlorine, alkyl of 1 to 4 carbon atoms, methoxy, ethoxy, nitro, amino, alkylamino, dialkylamino, where alkyl is of 1 to 4 carbon atoms, or alkanoylamino, where alkanoyl is of 1 to 4 carbon atoms.

$R^3$ is hydrogen, chlorine or alkyl of 1 to 4 carbon atoms, $R^4$ is hydrogen, chlorine or alkyl of 1 to 4 carbon atoms, T is hydrogen or alkyl of 1 to 4 carbon atoms, n is 1, 2 or 3, X is a radical of the formula

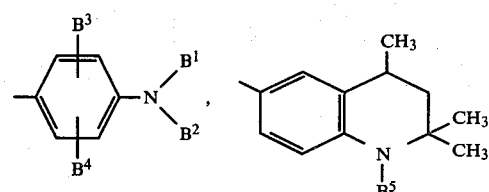

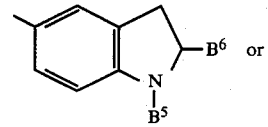

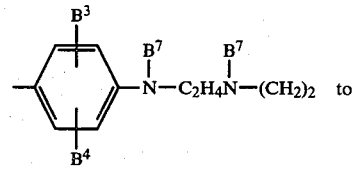

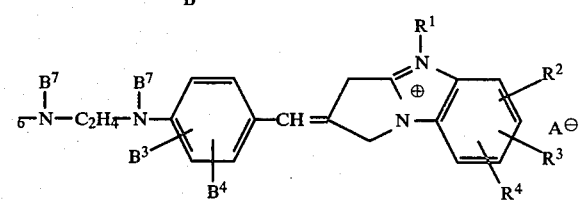

$B^1$ and $B^2$ independently of one another are alkyl of 1 to 8 carbon atoms, alkyl of 2 to 4 carbon atoms which is substituted by trialkylammonium, where alkyl is of 1 to 4 carbon atoms, alkoxy of 1 to 4 carbon atoms, chlorine, bromine, cyano, alkanoyloxy of 1 to 8 carbon atoms, alkoxycarbonyl, where alkoxy is of 1 to 8 carbon atoms, alkylaminocarbonyloxy, where alkyl is of 1 to 4 carbon atoms, or alkanoylamino, where alkanoyl is of 1 to 4 carbon atoms, allyl, cyclohexyl, benzyl which is unsubstituted or substituted by methyl or methoxy, phenylethyl, phenyl which is unsubstituted or substituted by methyl, methoxy or chlorine, or a radical of the formula

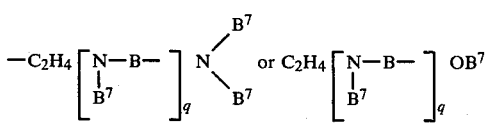

$B^3$ is hydrogen, methyl, ethyl, hydroxyl, methoxy or ethoxy, $B^4$ is hydrogen, chlorine, methyl or ethyl, $B^5$ is hydrogen, alkyl of 1 to 4 carbon atoms or benzyl, $B^6$ is hydrogen, methyl or phenyl, the radicals $B^7$ independently of one another are hydrogen, alkyl of 1 to 4 carbon atoms, or alkyl of 2 or 3 carbon atoms substituted by hydroxyl or alkoxy of 1 to 4 carbon atoms,

is pyrrolidino, piperidino, morpholino, piperazino, N-methylpiperazino or N-β-hydroxyethylpiperazino, B is straight-chain or branched $C_2$ to $C_6$ alkylene, q is 0, 1, 2 or 3 and $A^\ominus$ is an anion.

The radicals $X^1$ preferably have the formula

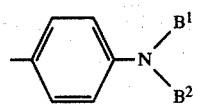

where $B^1$ and $B^2$ are preferably unsubstituted alkyl, especially of 1 to 4 carbon atoms, and preferentially methyl or ethyl. $R^1$ is preferably methyl, ethyl or benzyl.

The compounds of the formula I are yellow to orange and may be used as basic dyes for dyeing textiles of anionically modified fibers, but especially for dyeing, in particular mass-dyeing, paper, although they may be used for leather, tannin-treated cotton, writing fluids, print pastes, silk, cellulose acetate and lignin-containing fibers. Suitable substrates include bleached and unbleached sulfite cellulose, bleached and unbleached sulfate cellulose and groundwood. On paper, the dyes of the formula I are distinguished by high substantivity, good resistance to bleeding, fairly good lightfastness and high brilliance.

EXAMPLE 1

30 g of 4-methyl-pyrrolidino-[1.2-a]-benzimidazolium methosulfate are dissolved in 100 ml of alcohol, 15 g of p-dimethylaminobenzaldehyde and 10 ml of piperidine are added and the mixture is boiled. After 1 hour a precipitate separates out of the hot mixture. It is filtered off and washed with a small amount of cold ethanol. Yield, 31 g of dye of the formula

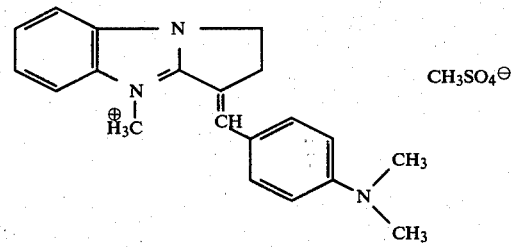

EXAMPLE 2

16 g of pyrrolidino-[1.2-a]-benzimidazole are dissolved in 100 ml of chloroform and 10 ml of dimethyl sulfate are added slowly at room temperature. The mixture is then stirred for 1 hour at 40° C. After adding 15 g of p-dimethylaminobenzaldehyde, the mixture is boiled for 2 hours and then cooled, and the dye which precipitates is filtered off. Yield: 24 g of dye of the formula given in Example 1.

EXAMPLE 3

86 g of butyrolactone and 108 g of o-phenylenediamine are heated, in the presence of 10 ml of glacial acetic acid, at 200° C. until 36 ml of $H_2O$ have distilled off. The mixture is allowed to cool and 95 ml of dimethyl sulfate are slowly added dropwise at 90°–110° C. The batch is then kept at 90° C. for 1 hour, after which 100 ml of piperidine are introduced dropwise and 149 g of p-dimethylaminobenzaldehyde are added. This mixture is kept at 90° C. for 1 hour, after which 100 ml of glacial acetic acid are added to the reaction batch and the homogeneous solution is poured out onto a dilute solution of sodium acetate in $H_2O$. Hereupon, crystallization occurs immediately. The product is filtered off and dried. Yield: 290 g of the dye of the formula

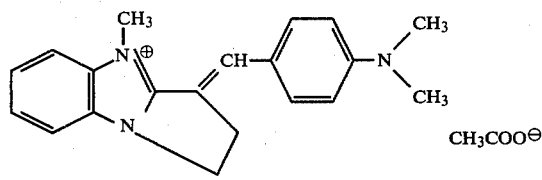

This dye may be used to prepare very concentrated solutions, eg. in glacial acetic acid/$H_2O$, which have a good shelf life.

EXAMPLE 4

41 g of 4,5-dimethyl-o-phenylenediamine, 26 g of butyrolactone and 5 ml of glacial acetic acid are heated at 200° C. until 11 ml of $H_2O$ have distilled off. The mixture is allowed to cool and 30 ml of dimethyl sulfate are slowly added dropwise at 90°–110° C. This mixture is kept for 1 hour at 90° C., after which 30 ml of piperidine are introduced dropwise and 55 g of p-dimethylaminobenzaldehyde are added. The reaction batch is kept at 90° C. for 1 hour.

40 ml of glacial acetic acid are then added and the homogeneous solution is poured out onto dilute sodium acetate solution.

Yield: 60 g of the dye of the formula

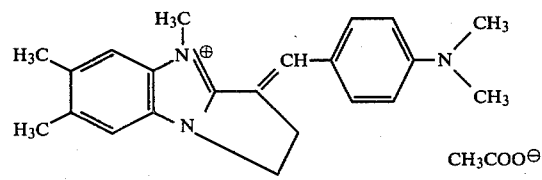

EXAMPLE 5

52 g of 6-methyl-pyrrolidino-[1.2-a]-benzimidazole are dissolved in 200 ml of alcohol and 30 ml of dimethyl sulfate are added dropwise. The mixture is then stirred for 1 hour at 40° C., after which 45 g of p-dimethylaminobenzaldehyde are introduced and 30 ml of piperidine are added dropwise. The reaction solution is boiled for 2 hours and then cooled, and the dye formed is filtered off.

Yield: 70 g of the dye of the formula

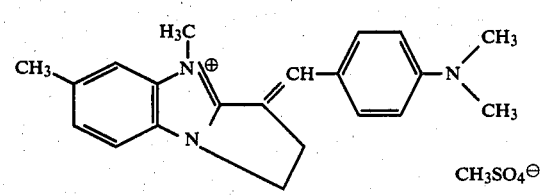

EXAMPLE 6

52 g of 6-methyl-pyrrolidino-[1.2-a]-benzimidazole are dissolved in 200 ml of alcohol and 30 ml of dimethyl sulfate are added dropwise. The mixture is stirred for 1 hour at 40° C. 51 g of p-diethylaminobenzaldehyde are then introduced and 30 ml of piperidine are added dropwise. The reaction solution is boiled for 2 hours and then cooled, and the dye formed is filtered off.

Yield: 73 g of the dye of the formula

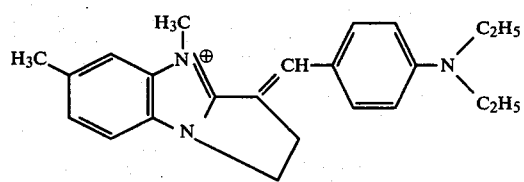

EXAMPLE 7

52 g of 6-methyl-pyrrolidino-[1.2-a]-benzimidazole are dissolved in 200 ml of chloroform and 40 ml of benzyl chloride are added dropwise. The mixture is heated to 60° C. and then stirred for one hour. Thereafter, 45 g of p-dimethylaminobenzaldehyde are introduced and 30 ml of piperidine are added dropwise. The reaction solution is boiled for 2 hours and then cooled, and the dye formed is filtered off.

Yield: 72 g of the dye of the formula

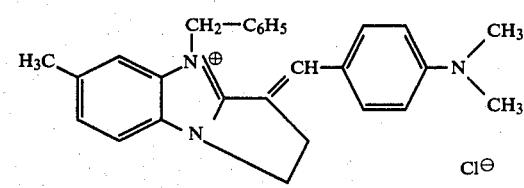

EXAMPLE 8

30 g of 4-ethyl-pyrrolidino-[1,2-a]-benzimidazolium methosulfate are dissolved in 100 ml of alcohol, 15 g of p-diethylaminobenzaldehyde and 10 ml of piperidine are added and the mixture is boiled. After 1 hour it is cooled and the product is filtered off and washed with a small amount of cold ethanol.

Yield: 28 g of the dye of the formula

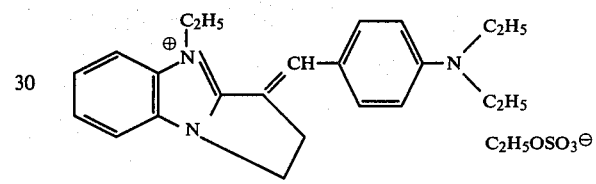

The Tables which follow list further Examples which are prepared by methods similar to those described above. The anion is in each case acetate.

| No. | $T^1$ | $T^2$ | $T^3$ | $T^4$ |
|---|---|---|---|---|
| 9 | $CH_3$ | H | H | H |
| 10 | $CH_3$ | $CH_3$ | H | H |
| 11 | $CH_3$ | H | $CH_3$ | H |
| 12 | H | $CH_3$ | $CH_3$ | H |
| 13 | $CH_3$ | $CH_3$ | $CH_3$ | H |
| 14 | $CH_3$ | H | $CH_3$ | $CH_3$ |
| 15 | $C_2H_5$ | H | H | H |
| 16 | $CH_3$ | $CH_3$ | $CH_3$ | $CH_3$ |
| 17 | H | $C_2H_5$ | H | H |
| 18 | H | $OCH_3$ | H | H |
| 19 | H | OH | H | H |
| 20 | H | Cl | H | H |
| 21 | H | H | Cl | H |
| 22 | H | Cl | Cl | H |
| 23 | H | $NO_2$ | H | H |
| 24 | H | $NH_2$ | H | H |
| 25 | H | $N(CH_3)_2$ | H | H |
| 26 | H | $N(C_4H_9)_2$ | H | H |
| 27 | H | N—C—CH$_3$ <br> H    ‖ <br>      O | H | H |
| 28 | H | $C_4H_9$ | H | H |
| 29 | H | $C_2H_5$ | $C_2H_5$ | H |

-continued

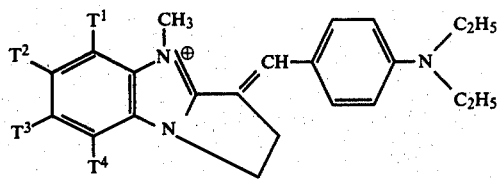

| No. | T¹ | T² | T³ | T⁴ |
|---|---|---|---|---|
| 30 | CH₃ | H | H | H |
| 31 | H | CH₃ | H | H |
| 32 | CH₃ | CH₃ | H | H |
| 33 | CH₃ | H | CH₃ | H |
| 34 | H | CH₃ | CH₃ | H |
| 35 | H | OC₂H₅ | H | H |

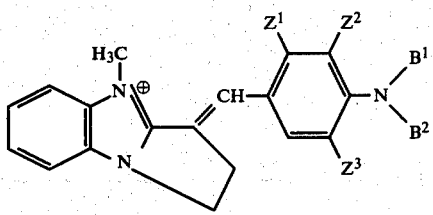

| No. | B¹ | B² | Z¹ | Z² | Z³ |
|---|---|---|---|---|---|
| 36 | C₃H₇ | C₃H₇ | H | H | H |
| 37 | iso-C₃H₇ | iso-C₃H₇ | H | H | H |
| 38 | C₄H₉ | C₄H₉ | H | H | H |
| 39 | iso-C₄H₉ | iso-C₄H₉ | H | H | H |
| 40 | CH₃ | C₂H₅ | H | H | H |
| 41 | n-C₅H₁₁ | C₅H₁₁ | H | H | H |
| 42 | n-C₆H₁₃ | C₆H₁₃ | H | H | H |
| 43 | n-C₈H₁₇ | n-C₈H₁₇ | H | H | H |
| 44 | C₂H₄N(C₄H₉)₃ | C₂H₄N(C₄H₉)₃ | H | H | H |
| 45 | C₂H₄—OCH₃ | C₂H₄—OCH₃ | H | H | H |
| 46 | C₄H₈—Br | C₄H₈—Br | H | H | H |
| 47 | C₂H₄—O—C(O)—C₄H₉ | C₂H₄—O—C(O)—C₄H₉ | H | H | H |
| 48 | C₂H₄—O—C(O)—C₈H₁₇ | C₂H₄—O—C(O)—C₈H₁₇ | H | H | H |
| 49 | C₄H₈OC₂H₅ | C₄H₈OC₂H₅ | H | H | H |
| 50 | C₁₂H₂₅ | C₁₂H₂₅ | H | H | H |
| 51 | CH₃ | CH₂—C₆H₅ | H | H | H |
| 52 | C₂H₅ | CH₂—CH₂Cl | H | H | H |
| 53 | C₂H₅ | CH₂—CH₂CN | H | H | H |
| 54 | CH₃ | C₆H₅ | H | H | H |
| 55 | CH₃ | p-C₆H₄Cl | H | H | H |
| 56 | C₂H₅ | C₂H₅ | OH | H | H |
| 57 | CH₃ | p-C₆H₄CH₃ | H | H | H |
| 58 | CH₃ | p-C₆H₄OCH₃ | H | H | H |
| 59 | C₂H₅ | CH₂—CH₂—OCOCH₃ | H | H | H |
| 60 | CH₃ | CH₂CH₂—NHCOCH₃ | H | H | H |
| 61 | C₂H₅ | CH₂—CH₂—C₆H₅ | H | H | H |
| 62 | C₂H₅ | CH₂—CH₂—N(CH₃)₂ | H | H | H |
| 63 | C₂H₅ | CH₂—CH₂—N⁺(CH₃)₃ | H | H | H |
| 64 | CH₃ | CH₂—CH₂—COOCH₃ | H | H | H |
| 65 | CH₃ | CH₃ | OCH₃ | H | H |
| 66 | CH₃ | CH₃ | OC₂H₅ | H | H |
| 67 | CH₃ | CH₃ | Cl | H | H |
| 68 | CH₃ | CH₃ | CH₃ | H | H |
| 69 | CH₃ | CH₃ | H | CH₃ | H |
| 70 | —(CH₂)₂—O—(CH₂)₂— | | H | H | H |
| 71 | —(CH₂)₂—N(CH₃)—(CH₂)₂— | | H | H | H |
| 72 | —(CH₂)₂—SO₂—(CH₂)₂— | | H | H | H |
| 73 | —CH₂—CH₂—CH₂—CH₂— | | H | H | H |
| 74 | CH₂CH=CH₂ | CH₂CH=CH₂ | H | H | H |
| 75 | CH₃ | CH₃ | CH₃ | CH₃ | H |
| 76 | CH₃ | CH₃ | C₂H₅ | H | H |
| 77 | CH₃ | CH₃ | Cl | H | H |
| 78 | CH₃ | C₆H₁₁ | H | H | H |
| 79 | CH₂C₆H₅ | CH₃ | H | H | H |
| 80 | CH₂-p-C₆H₄—CH₃ | CH₃ | H | H | H |
| 81 | CH₂-p-C₆H₄—OCH₃ | CH₃ | H | H | H |

| 82 | C₂H₄—C(=O)—OC₈H₁₇ | C₂H₅ | H | H | H |

EXAMPLE 83

A mixture of 33 g of o-phenylenediamine, 30 g of δ-valerolactone and 5 ml of glacial acetic acid is heated at 200° C. until 12 ml of H₂O have distilled off. The mixture is allowed to cool, 30 g of dimethyl sulfate are added dropwise at 90° C., the batch is kept for one hour at 90°, 25.5 g of piperidine are introduced dropwise and 55 g of p-dimethylaminobenzaldehyde are added. This batch is kept for one hour at 90° and is then poured out onto 200 ml of ethanol/water. The crystals which precipitate are filtered off and dried.

Yield: 52 g of the dye of the formula

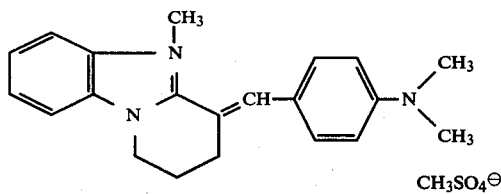

CH₃SO₄⁻

The dyes listed in the Table which follows are synthesized by a similar method. The anion is in each case acetate.

| S¹ | S² | S³ | S⁴ |
|----|----|----|----|
| H  | CH₃ | H | H |
| H  | CH₃ | CH₃ | H |
| H  | Cl | H | H |

| No. | R¹ |
|-----|----|
| 84 | n-C₃H₇ |
| 85 | iso-C₃H₇ |
| 86 | n-C₄H₉ |
| 87 | iso-C₄H₉ |
| 88 | n-C₅H₁₁ |
| 89 | n-C₆H₁₃ |
| 90 | n-C₁₂H₂₅ |
| 91 | CH₂—CH₂—CN |
| 92 | CH₂—CH₂—OH |
| 93 | CH₂-p-C₆H₄—OCH₃ |
| 94 | CH₂-p-C₆H₄CH₃ |
| 95 | CH₂-p-C₆H₄Cl |
| 96 | CH₂—CH₂—CONH₂ |
| 97 | CH₂—CH₂—COOCH₃ |
| 98 | n-C₁₆H₃₃ |

| No. | R¹ |
|-----|----|
| 99 | n-C₁₈H₃₇ |
| 100 | C₄H₈OH |
| 101 | C₂H₄—O—C₄H₉ |
| 102 | C₄H₈—O—CH₃ |
| 103 | C₂H₄Cl |
| 104 | C₄H₈Br |
| 105 | C₄H₈Cl |
| 106 | CH₂—C₆H₅ |
| 107 | CH₂-p-C₆H₄—OC₂H₅ |
| 108 | CH₂—CH₂—C₆H₅ |
| 109 | C₂H₄—O—C(=O)—C₄H₉ |

TABLE

| No. | B⁵ | B⁶ |
|-----|----|----|
| 110 | CH₂—C₆H₅ | H |
| 111 | CH₃ | H |
| 112 | CH₃ | CH₃ |
| 113 | H | H |

B⁵ = H, CH₃, C₂H₅, CH₂—C₆H₅

EXAMPLE 114

52 g of 6-methyl-pyrrolidino-[1,2-a]-benzimidazole are dissolved in 200 ml of alcohol and 30 ml of dimethyl sulfate are added dropwise. The mixture is then stirred for 1 hour at 40° C. 62 g of N-2-chloroethyl-N-ethyl-p-aminobenzaldehyde are then introduced and 30 ml of piperidine are added dropwise. The reaction solution is boiled for 2 hours and then cooled, and the dye formed is filtered off.

Yield: 75 g of the dye of the formula

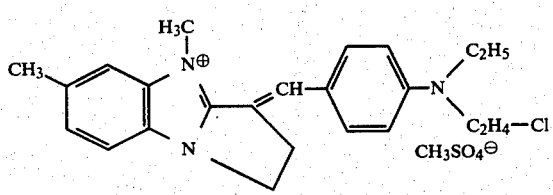

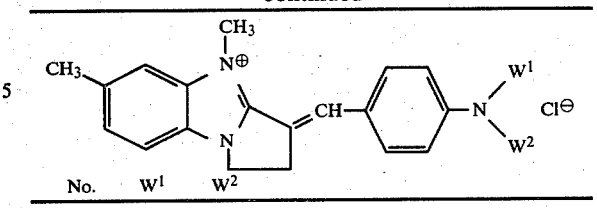

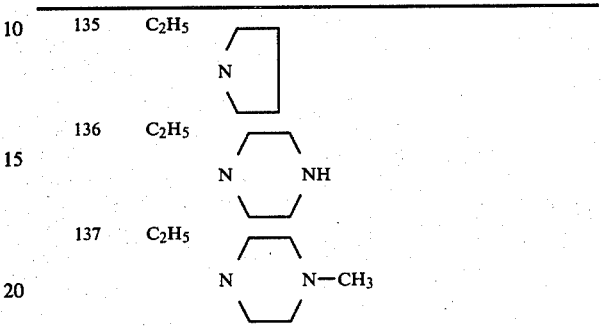

EXAMPLE 115

30 g of the dye from Example 114 are dissolved in 30 ml of glycol and 10 g of ethylenediamine are added at 130° C. The mixture is then stirred for one hour at 130° C., after which 30 ml of glacial acetic acid are added dropwise at 80° C. The reaction mixture thus formed has a good shelf life and may be used for the dyeing of paper. To isolate the dye, the mixture is poured onto 200 ml of water and the dye is precipitated by adding zinc chloride.

Yield: 40 g of the dye of the formula

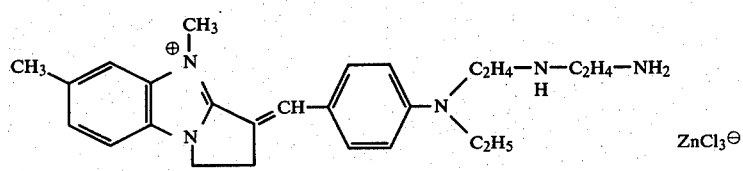

The yellow dyes listed in the Table which follows can also be prepared by a similar method:

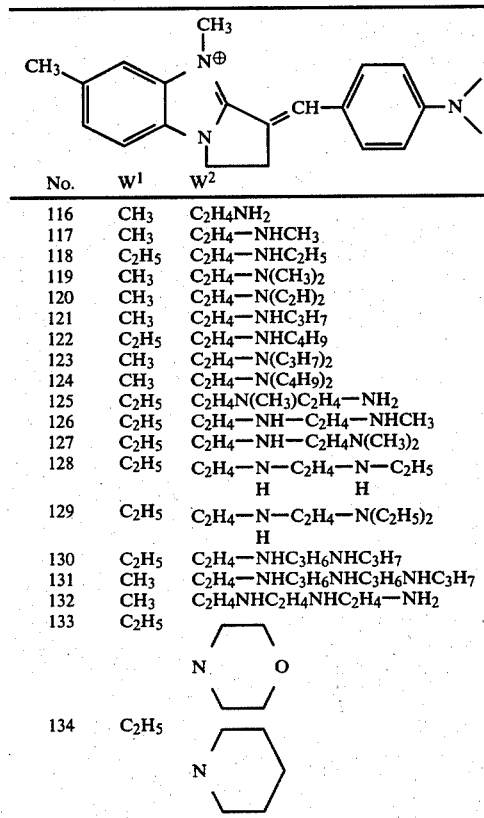

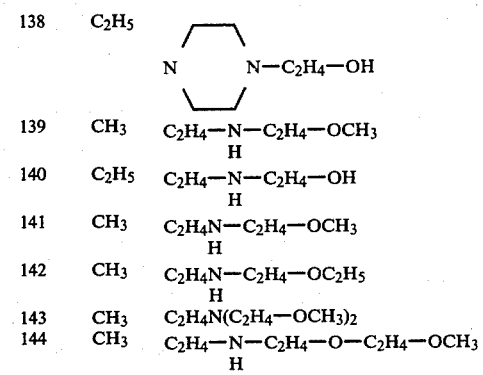

| No. | $W^1$ | $W^2$ |
|---|---|---|
| 116 | $CH_3$ | $C_2H_4NH_2$ |
| 117 | $CH_3$ | $C_2H_4-NHCH_3$ |
| 118 | $C_2H_5$ | $C_2H_4-NHC_2H_5$ |
| 119 | $CH_3$ | $C_2H_4-N(CH_3)_2$ |
| 120 | $CH_3$ | $C_2H_4-N(C_2H)_2$ |
| 121 | $CH_3$ | $C_2H_4-NHC_3H_7$ |
| 122 | $C_2H_5$ | $C_2H_4-NHC_4H_9$ |
| 123 | $CH_3$ | $C_2H_4-N(C_3H_7)_2$ |
| 124 | $CH_3$ | $C_2H_4-N(C_4H_9)_2$ |
| 125 | $C_2H_5$ | $C_2H_4N(CH_3)C_2H_4-NH_2$ |
| 126 | $C_2H_5$ | $C_2H_4-NH-C_2H_4-NHCH_3$ |
| 127 | $C_2H_5$ | $C_2H_4-NH-C_2H_4N(CH_3)_2$ |
| 128 | $C_2H_5$ | $C_2H_4-N(H)-C_2H_4-N(H)-C_2H_5$ |
| 129 | $C_2H_5$ | $C_2H_4-N(H)-C_2H_4-N(C_2H_5)_2$ |
| 130 | $C_2H_5$ | $C_2H_4-NHC_3H_6NHC_3H_7$ |
| 131 | $CH_3$ | $C_2H_4-NHC_3H_6NHC_3H_6NHC_3H_7$ |
| 132 | $CH_3$ | $C_2H_4NHC_2H_4NHC_2H_4-NH_2$ |
| 133 | $C_2H_5$ | morpholino |
| 134 | $C_2H_5$ | piperidino |
| 135 | $C_2H_5$ | pyrrolidino |
| 136 | $C_2H_5$ | piperazino-NH |
| 137 | $C_2H_5$ | 4-methylpiperazino |
| 138 | $C_2H_5$ | 4-(2-hydroxyethyl)piperazino |
| 139 | $CH_3$ | $C_2H_4-N(H)-C_2H_4-OCH_3$ |
| 140 | $C_2H_5$ | $C_2H_4-N(H)-C_2H_4-OH$ |
| 141 | $CH_3$ | $C_2H_4N(H)-C_2H_4-OCH_3$ |
| 142 | $CH_3$ | $C_2H_4N(H)-C_2H_4-OC_2H_5$ |
| 143 | $CH_3$ | $C_2H_4N(C_2H_4-OCH_3)_2$ |
| 144 | $CH_3$ | $C_2H_4-N(H)-C_2H_4-O-C_2H_4-OCH_3$ |

EXAMPLE 145

41 g of 4,5-dimethyl-o-phenylenediamine, 30 g of valerolactone and 5 ml of glacial acetic acid are heated at 200° C. until 11 ml of $H_2O$ have distilled off. The mixture is allowed to cool and 30 ml of dimethyl sulfate are slowly added dropwise at 90°–110° C. The batch is kept at 90° C. for 1 hour, after which 30 ml of piperidine are introduced dropwise and 55 g of p-dimethylaminobenzaldehyde are added. The reaction mixture is kept at 90° C. for 1 hour, 40 ml of glacial acetic acid are added and the homogeneous solution is poured out onto dilute sodium acetate solution.

Yield: 70 g of the dye of the formula

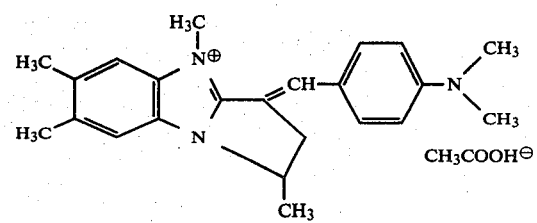

EXAMPLE 146

98 g of γ-valerolactone and 108 g of o-phenylenediamine are heated in the presence of 10 ml of glacial acetic acid at 200° C. until 36 ml of H₂O have distilled off. The mixture is allowed to cool and 95 ml of dimethyl sulfate are slowly added dropwise at 90°–110° C. The batch is then kept at 90° C. for 1 hour, after which 100 ml of piperidine are introduced dropwise and 149 g of p-dimethylaminobenzaldehyde are added. The reaction batch is kept for 1 hour at 90° C., 100 ml of glacial acetic acid are added and the homogeneous solution is poured out onto a dilute solution of sodium acetate in H₂O. Hereupon crystallization immediately occurs. The product is filtered off and dried.

Yield: 250 g of the dye of the formula are added. The reaction mixture is kept at 90° C. for 1 hour, 100 ml of glacial acetic acid are then added, and the homogeneous solution is poured into a dilute solution of sodium acetate in H₂O. Hereupon, crystallization occurs. The product is filtered off and dried.

Yield: 90 g of the dye of the formula

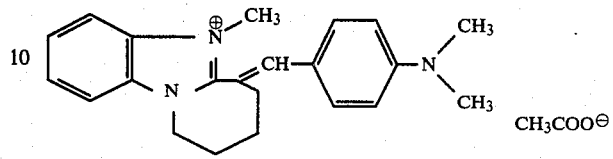

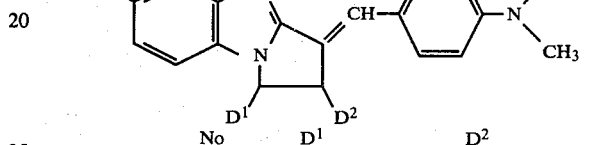

| No  | D¹    | D²  |
|-----|-------|-----|
| 148 | CH₃   | H   |
| 149 | H     | CH₃ |
| 150 | C₂H₅  | H   |
| 151 | C₃H₇  | H   |
| 152 | C₄H₉  | H   |

| No  | M¹    | M²    | K                           |
|-----|-------|-------|-----------------------------|
| 153 | CH₃   | CH₃   | N—C₂H₄—NH<br>H              |
| 154 | C₂H₅  | C₂H₅  | N—C₂H₄—N<br>CH₃   CH₃       |
|     | CH₃   | C₂H₅  | N—C₂H₄—N<br>H      CH₃      |
| 156 | C₂H₅  | C₂H₅  | N—C₃H₆—N<br>H      H        |
| 157 | C₂H₅  | C₂H₅  | N—(CH₂)₆—N<br>H       H     |

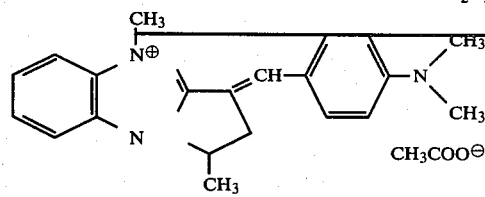

EXAMPLE 147

114 g of ε-caprolactone and 108 g of o-phenylenediamine are heated, in the presence of 10 ml of 50% strength phosphorous acid, at 220° C., until 36 ml of H₂O have distilled off. The mixture is allowed to cool and 95 ml of dimethyl sulfate are slowly added dropwise at 90°–110° C. The temperature is kept at 90° C. for 1 hour after which 100 ml of piperidine are introduced dropwise and 149 g of p-dimethylaminobenzaldehyde

EXAMPLE 158

50 g of the dye from Example 114 are dissolved in 30 ml of glycol, 6 g of ethylenediamine are added slowly at 130° C. and the mixture is kept at this temperature for one hour. 20 ml of glacial acetic acid are then added at 80° C. The resulting dye solution has a good shelf life and may be used for dyeing paper. To isolate the dye, the mixture is poured into 250 ml of water and the dye is precipitated by adding zinc chloride.

Yield: 60 g of the dye of the formula

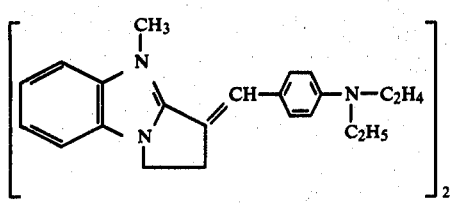

We claim:
1. Paper dyed with a compound of the formula

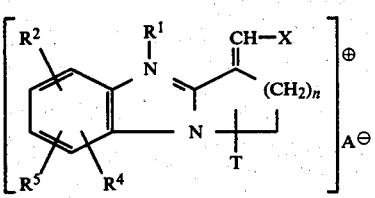

where
- $R^1$ is alkyl of 1 to 12 carbon atoms, alkyl of 2 to 4 carbon atoms which may be substituted by hydroxyl, alkoxy of 1 to 4 carbon atoms, alkanoyloxy of 1 to 4 carbon atoms, carbamoyl, cyano, chlorine or bromine, benzyl, which is unsubstituted or substituted by methyl, methoxy, ethoxy or chlorine, or phenylethyl,
- $R^2$ is hydrogen, chlorine, alkyl of 1 to 4 carbon atoms, methoxy, ethoxy, nitro, amino, alkylamino, dialkylamino, where alkyl is of 1 to 4 carbon atoms, or alkanoylamino, where alkanoyl is of 1 to 4 carbon atoms,
- $R^3$ is hydrogen, chlorine or alkyl of 1 to 4 carbon atoms,
- $R^4$ is hydrogen, chlorine or alkyl of 1 to 4 carbon atoms,
- T is hydrogen or alkyl of 1 to 4 carbon atoms,
- n is 1, 2 or 3,
- X is a radical of the formula

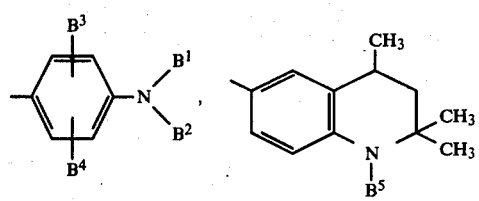

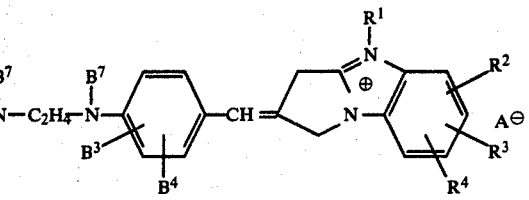

- $B^1$ and $B^2$ independently of one another are alkyl of 1 to 8 carbon atoms, alkyl of 2 to 4 carbon atoms which is substituted by trialkylammonium, where alkyl is of 1 to 4 carbon atoms, alkoxy of 1 to 4 carbon atoms, chlorine, bromine, cyano, alkanoyloxy of 1 to 8 carbon atoms, alkoxycarbonyl, where alkoxy is of 1 to 8 carbon atoms, alkylaminocarbonyloxy, where alkyl is of 1 to 4 carbon atoms, or alkanoylamino, where alkanoyl is of 1 to 4 carbon atoms, allyl, cyclohexyl, benzyl which is unsubstituted or substituted by methyl or methoxy, phenylethyl, phenyl which is unsubstituted or substituted by methyl, methoxy or chlorine, or a radical of the formula

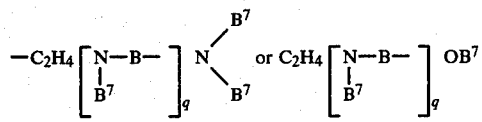

- $B^3$ is hydrogen, methyl, ethyl, hydroxyl, methoxy or ethoxy,
- $B^4$ is hydrogen, chlorine, methyl or ethyl,
- $B^5$ is hydrogen, alkyl of 1 to 4 carbon atoms or benzyl,
- $B^6$ is hydrogen, methyl or ethyl,
- the radicals $B^7$ independently of one another are hydrogen, alkyl of 1 to 4 carbon atoms, or alkyl of 2 or 3 carbon atoms substituted by hydroxyl or alkoxy of 1 to 4 carbon atoms

is pyrrolidino, piperidino, morpholino, piperazino, N-methylpiperazino or N-β-hydroxyethylpiperazino,
- B is straight-chain or branched $C_2$ to $C_6$ alkylene,
- q is 0, 1, 2 or 3 and
- $A^\ominus$ is an anion.

2. Paper dyed with a compound as claimed in claim 1, where $R^1$ is methyl, ethyl or benzyl.

3. Paper dyed with a compound as claimed in claim 1, where $R^2$ is hydrogen, methyl or chlorine, $R^3$ is hydrogen, chlorine or methyl and $R^4$ is hydrogen.

4. Paper dyed with a compound as claimed in claim 1, where T is hydrogen or methyl.

5. Paper dyed with a compound as claimed in claim 1, where n is 1 or 2.

6. Paper dyed with a compound as claimed in claim 1, where X is a radical of the formula

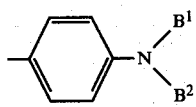

and $B^1$ and $B^2$ have the stated meanings.

7. Paper dyed with a compound as claimed in claim 6, where $B^1$ and $B^2$ independently of one another are methyl, ethyl, β-chloroethyl or a radical of the formula

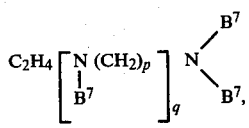

p is 2,3,4,5 or 6
and $B^7$ and q have the stated meanings.

8. Paper dyed with a compound as claimed in claim 1, of the formula

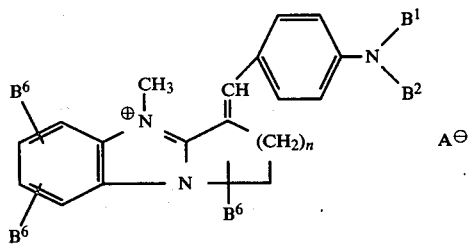

where $B^6$ is hydrogen or methyl and $B^1$, $B^2$, n and $A^\ominus$ have the meanings given in claim 1.

9. Paper dyed with a compound as claimed in claim 8, where $B^1$ and $B^2$ independently of one another are methyl, ethyl, β-chloroethyl or a radical of the formula

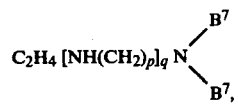

p is 2,3 or 4,
and $B^7$ and q have the meanings given in claim 1.

10. Paper dyed with a compound as claimed in claim 1, of the formula

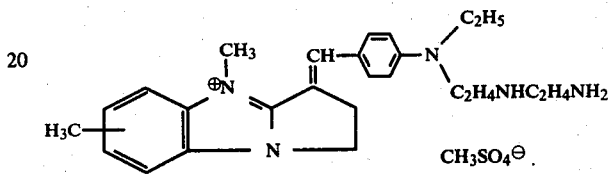

11. Paper dyed with a compound as claimed in claim 1, of the formula

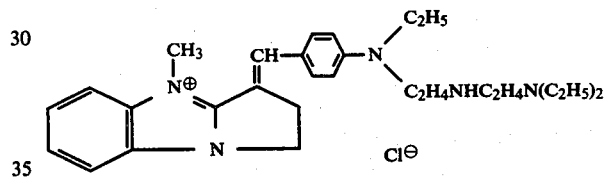

* * * * *